United States Patent
Zillmer et al.

(10) Patent No.: US 7,562,732 B2
(45) Date of Patent: Jul. 21, 2009

(54) METHOD FOR OPERATING A HYBRID MOTOR VEHICLE

(75) Inventors: Michael Zillmer, Sickte (DE); Matthias Holz, Lehre (DE); Ekkehard Pott, Gifhorn (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 49 days.

(21) Appl. No.: 11/641,294

(22) Filed: Dec. 19, 2006

(65) Prior Publication Data

US 2007/0099749 A1 May 3, 2007

Related U.S. Application Data

(63) Continuation of application No. PCT/EP2005/005934, filed on Jun. 2, 2005.

(30) Foreign Application Priority Data

Jul. 2, 2004 (DE) .................. 10 2004 032 173

(51) Int. Cl.
*B60K 1/00* (2006.01)
*B60W 20/00* (2006.01)

(52) U.S. Cl. .................. 180/65.51; 180/65.285; 180/65.28; 903/903

(58) Field of Classification Search ............... 180/65.2, 180/65.3, 65.6, 65.5, 65.7, 65.8, 65.51, 65.285, 180/65.28; 290/38 B, 31; 477/3, 115, 45; 903/903, 905, 906, 941; 701/67, 68
See application file for complete search history.

(56) References Cited

U.S. PATENT DOCUMENTS

| | | | |
|---|---|---|---|
| 5,495,127 A | 2/1996 | Aota et al. | |
| 5,537,967 A | 7/1996 | Tashiro et al. | |
| 6,192,847 B1 | 2/2001 | Davis | |
| 6,253,140 B1 * | 6/2001 | Jain et al. | 701/67 |
| 6,278,195 B1 | 8/2001 | Yamaguchi et al. | |
| 6,371,889 B1 | 4/2002 | Kuroda et al. | |
| 6,441,506 B2 * | 8/2002 | Nakashima | 180/65.2 |
| 6,453,864 B1 | 9/2002 | Downs et al. | |
| 6,543,561 B1 | 4/2003 | Pels et al. | |
| 6,807,934 B2 * | 10/2004 | Kataoka et al. | 290/38 B |
| 7,021,409 B2 * | 4/2006 | Tamor | 180/65.2 |
| 7,115,064 B2 * | 10/2006 | Masterson et al. | 477/3 |
| 7,185,722 B1 * | 3/2007 | Sakamoto et al. | 180/65.2 |
| 7,261,672 B2 * | 8/2007 | Frank et al. | 477/45 |
| 7,263,959 B2 * | 9/2007 | Kataoka et al. | 290/31 |
| 7,407,026 B2 * | 8/2008 | Tamor | 180/65.2 |
| 2004/0079564 A1 * | 4/2004 | Tabata | 180/65.2 |
| 2004/0134698 A1 * | 7/2004 | Yamamoto et al. | 180/65.2 |
| 2004/0176203 A1 * | 9/2004 | Supina et al. | 475/8 |
| 2004/0189254 A1 * | 9/2004 | Kapsokavathis et al. | 320/132 |

(Continued)

FOREIGN PATENT DOCUMENTS

DE 19814402 C2 10/1999

(Continued)

*Primary Examiner*—Hau V Phan
(74) *Attorney, Agent, or Firm*—Manfred Beck, P.A.

(57) ABSTRACT

A method for operating a hybrid motor vehicle which has an internal combustion engine and at least one electric machine is provided. When turning off the internal combustion engine and/or when starting the internal combustion engine, a torque characteristic of the electric machine for starting the internal combustion engine or turning off the internal combustion engine is feedforward-controlled.

16 Claims, 2 Drawing Sheets

U.S. PATENT DOCUMENTS

2005/0011689 A1 * 1/2005 Tajima et al. .............. 180/65.2

FOREIGN PATENT DOCUMENTS

| DE | 10040094 | A1 | 4/2001 |
| DE | 10201278 | A1 | 8/2002 |
| EP | 0839683 | A2 | 5/1998 |
| EP | 1068090 | A | 1/2001 |
| EP | 1369281 | A1 | 12/2003 |

* cited by examiner

METHOD FOR OPERATING A HYBRID MOTOR VEHICLE

CROSS-REFERENCE TO RELATED APPLICATIONS

This application is a continuation, under 35 U.S.C. § 120, of copending International Application No. PCT/EP2005/005934, filed Jun. 2, 2005, which designated the United States; this application also claims the priority, under 35 U.S.C. § 119, of German Patent Application No. DE 10 2004 032 173.6, filed Jul. 2, 2004; the prior applications are herewith incorporated by reference in their entirety.

BACKGROUND OF THE INVENTION

Field of the Invention

The invention relates to a method for operating a hybrid motor vehicle which has an internal combustion engine and at least one electric machine.

Conventional hybrid vehicles, which have an electric machine (for example a starter generator) between an internal combustion engine and a transmission, are known. In the case of manually shifted transmissions, the electric machine can usually be disengaged from the transmission by a clutch, wherein this clutch also serves as a starting clutch.

At least when the vehicle is at a standstill, but also during phases of deceleration, the internal combustion engine can be turned off in order to save fuel in these vehicles. German Patent Application Publication No. DE 100 40 094 A1 discloses an automatic start-stop-controlling/regulating device for an internal combustion engine of a motor vehicle. The restart of the internal combustion engine is performed by the electric machine, also called the starter generator, at the latest when a torque is requested by the driver. Since hybrid vehicles have substantially more powerful electric motors as compared to conventional starter motors, the restart of the engine is possible with a high degree of comfort. Due to the high electromotive torque, it is possible to drag the internal combustion engine within a short period of time up to its starting speed or idle speed, such that the start delay is barely noticeable for the driver. In addition, the starting process is also acoustically more comfortable, because the typical meshing noise and running noise of a conventional starter is no longer present.

Nevertheless the start or restart of the internal combustion engine after a stop-phase is also noticeable in hybrid vehicles, which is attributed mainly to the oscillating torques that are created when cranking the internal combustion engine. The oscillating torques are caused by the individual operating cycles of the internal combustion engine, mainly the compression phase and the subsequent expansion phase. They depend in particular on the number of strokes (two stroke engine or four stroke engine), on the number of cylinders, on the control timing and the compression ratio. Furthermore, oscillating torques are caused by the oscillating inertial forces.

In conventional controls of hybrid drive systems the running-up of the internal combustion engine during start is performed by a speed control method or torque control method, in order to follow a given setpoint course or target course with smallest possible deviations. The global setpoint speed course or setpoint torque course predefines in this case how the internal combustion engine runs from standstill up to its starting speed or idle speed. The influence of oscillating torques is not included in these global setpoint courses. To be precise, deviations from the setpoint course are in principle compensated by a superimposed closed-loop control, in practice however, the oscillating torques generate disturbance variables for the closed-loop control such that in particular in case of the speed control of the electric machine but also in case of a torque control, control deviations occur (even in case of a constant feedforward control for the torque, fluctuations in the torque occur due to changing reaction torques of the internal combustion engine). For this reason, there is a potential for improvement in comfort for the highly dynamic, short start procedure of the internal combustion engine.

In case of a drive system with an electric machine it is known from German Patent No. DE 198 14 402 C2 to give the electric machine a double function in the first phase of the driving-away process. On the one hand, the electric machine serves to accelerate the vehicle when driving away, on the other hand, the electric machine cranks up the internal combustion engine for starting. In addition, the electric machine generates an oscillating torque which has the same absolute value and is opposite in phase to the torque fluctuations which the internal combustion engine generates when being dragged along.

German Patent Application Publication No. DE 102 01 278 A1 discloses a method for turning off an internal combustion engine with a defined position of the crankshaft.

SUMMARY OF THE INVENTION

It is accordingly an object of the invention to provide a method for operating a hybrid motor vehicle which overcomes the above-mentioned disadvantages of the heretofore-known methods of this general type and which improves an operating behavior of a hybrid motor vehicle in a start up operation or a turn off operation.

With the foregoing and other objects in view there is provided, in accordance with the invention, a method for operating a hybrid motor vehicle, which includes the steps of:

providing a hybrid motor vehicle having an internal combustion engine and at least one electric machine; and performing, during a turning off process of the internal combustion engine and/or a starting process of the internal combustion engine, a feedforward control on the torque characteristic of the electric machine for one of starting the internal combustion engine and when turning off the internal combustion engine.

In other words, according to the invention, there is provided a method for operating a hybrid motor vehicle which has an internal combustion engine and at least one electric machine, wherein, when turning off the internal combustion engine and/or when starting the internal combustion engine, a torque characteristic of the electric machine for starting the internal combustion engine or when turning off the internal combustion engine is feedforward-controlled.

This has the advantage that influences on the body of the motor vehicle, that are subjectively perceived as bothersome or annoying, are directly minimized during the starting or turning off of the internal combustion engine.

Another mode of the method according to the invention includes measuring forces introduced into a vehicle body via a mounting of a drivetrain component.

A further mode of the method according to the invention includes measuring the forces introduced into the vehicle body only beforehand in order to optimize a torque-feedforward control characteristic.

Another mode of the method according to the invention includes permanently measuring the forces introduced into the vehicle body by using a sensor provided in the hybrid motor vehicle.

Another mode of the method according to the invention includes measuring forces introduced into a vehicle body via at least one mounting of at least one drivetrain component such as the internal combustion engine, a transmission or a further drivetrain component.

A further mode of the method according to the invention includes performing the feedforward control on the torque characteristic of the electric machine for starting the internal combustion engine and/or when turning off the internal combustion engine such that forces, which are present at at least one mounting of at least one drivetrain component such as the internal combustion engine or a transmission, have minimal amplitudes.

Another mode of the method according to the invention includes turning off the internal combustion engine in given operating situations by using a start-stop automatic; and starting the internal combustion engine again, in case of a driver request, by using the electric machine.

Another mode of the method according to the invention includes performing the feedforward control on the torque characteristic of the electric machine such that an excitation of natural frequencies of a vehicle body is minimized.

Another mode of the method according to the invention includes performing the feedforward control on the torque characteristic of the electric machine by providing a given base torque characteristic for overcoming a mean or average friction and for ensuring a given angular speed of a crankshaft of the internal combustion engine and by superimposing an oscillating torque on the given base torque characteristic, the oscillating torque being dependent on a position of the crankshaft.

Yet another mode of the method according to the invention includes superimposing an additional control onto the feedforward control of the torque characteristic of the electric machine in order to minimize mounting forces, e.g. forces acting on a mounting of a drivetrain component.

Another mode of the method according to the invention includes performing the feedforward control on the torque characteristic of the electric machine, in case of starting the internal combustion engine, until a given start speed, at which a fuel injection begins, and/or a given idle speed is reached.

Another mode of the method according to the invention includes additionally performing the feedforward control on the torque characteristic of the electric machine subsequent to reaching the start speed beyond a given period by additionally superimposing a counter torque on a feedforward-controlled torque characteristic of the electric machine such that torque oscillations, which are caused by first ones of combustion processes that are setting in, are damped.

Another mode of the method according to the invention includes using a starter generator as the electric machine.

Another mode of the method according to the invention includes providing the electric machine such that the electric machine has a power in a range between 7 kW and 25 kW, preferably in a range between 8 kW and 20 kW and, in accordance with a particularly preferred mode, the electric machine has a power of substantially 15 kW.

As described above, in a preferred mode of the method according to the invention, the forces that are introduced into the vehicle body via the engine mountings and/or transmission mountings and/or further mountings of drivetrain components are measured, wherein the measurement is done only beforehand for optimizing the torque-feedforward characteristic and/or the measurement is done permanently by sensors provided in the vehicle. A torque characteristic of the electric machine for starting the internal combustion engine or when turning off the internal combustion engine is in this case feedforward-controlled such that the forces at the engine mountings and/or transmission mountings and/or further drivetrain component mountings have minimal amplitudes. In this manner it is possible to gain a measure for the subjective feeling of comfort in order to perform or apply a comfort-optimized engine start based thereon.

It is expedient to provide a start-stop automatic which turns off the internal combustion engine during given operating situations and, in case of a load demand by a driver, starts the internal combustion engine again by using the starter generator. As explained, in accordance with a preferred mode of the method according to the invention, the torque characteristic of the electric machine and, respectively, of the starter generator is feedforward-controlled such that an excitation of natural frequencies of the vehicle body is minimized. In order to further minimize the rotational irregularities caused by gas forces in the cylinders of the internal combustion engine, the torque characteristic of the starter generator is feedforward-controlled such that an oscillating torque, which depends on the position of the crankshaft, is superimposed on a given base torque characteristic for overcoming a mean or average friction and for ensuring a given angular speed of a crankshaft of the internal combustion engine. In case of starting the internal combustion engine, it is expedient to perform the feedforward control on the torque characteristic of the electric machine until a given start speed, at which a fuel injection begins, or until a given idle speed is reached. A further increase in comfort when starting the internal combustion engine, wherein the operation of the internal combustion engine is setting in in a particularly soft manner, is achieved in that the method is performed additionally, after reaching the start speed, beyond a predetermined period, wherein in addition a counter torque is superimposed onto the feedforward-controlled torque characteristic of the electric machine and, respectively, the starter generator, that dampens torque fluctuations caused by the first combustion processes when they set in.

Other features which are considered as characteristic for the invention are set forth in the appended claims.

Although the invention is illustrated and described herein as embodied in a method for operating a hybrid motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
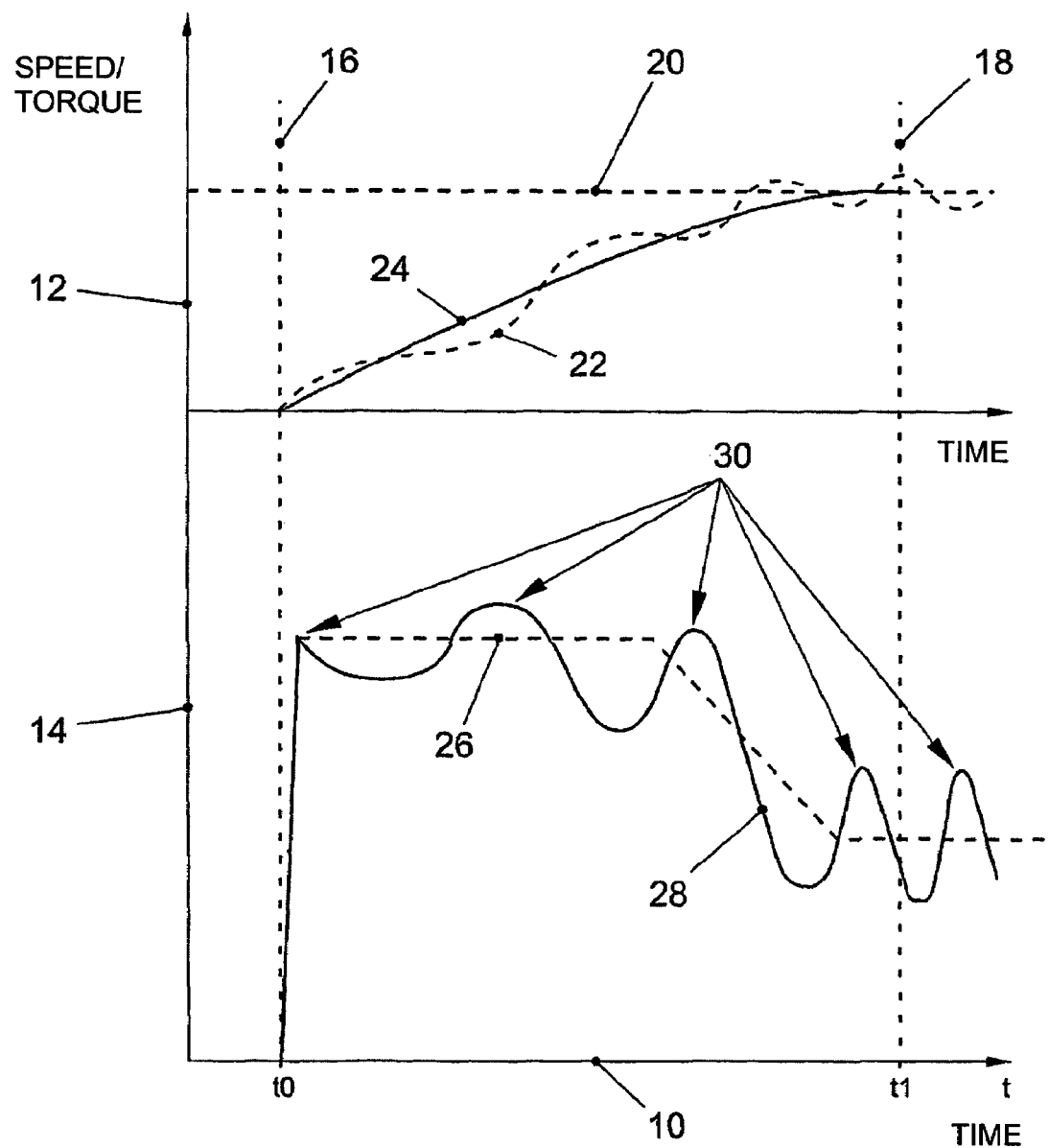
FIG. 1 is a graph illustrating an engine speed characteristic and a torque characteristic of the electric machine over time between the start of the internal combustion engine and reaching a start speed or idle speed wherein the solid lines illustrate an engine speed characteristic and a torque characteristic in accordance with the invention.

Referring now to the figures of the drawings in detail and first, particularly, to FIG. 1 thereof, there is shown an engine speed characteristic and a torque characteristic of the electric machine 46 over time between the start of the internal combustion engine 42 and reaching the start speed or idle speed.

The method according to the invention is preferably used when turning off and, respectively, when starting an internal combustion engine 42 of a hybrid motor vehicle 40 having an internal combustion engine 42 and an electric machine 46 (for example a starter generator) wherein in predetermined operating situations, for example when stopping at a traffic light or during an overrunning operation, the start-stop automatic 50 turns the internal combustion engine 42 off in order to save fuel (stop phase) and starts it again by means of the electric machine 46 when requested by a driver. In the following, the method according to the invention is illustrated with the help of FIG. 1 for the starting procedure. However, this is not to be understood as a limitation of the method according to the invention to the starting procedure of the internal combustion engine 42.

The horizontal axis 10 in FIG. 1 indicates time t, the vertical axis 12 indicates the speed, i.e. the rotational speed, of the internal combustion engine 42 and the vertical axis 14 indicates the torque of the electric machine 46. Reference numeral 16 indicates a time t0 at which an engine start begins. Reference numeral 18 indicates the time t1 at which a start speed, at which a fuel injection and, if applicable, an ignition in a spark ignition engine occurs, or an idle speed is reached. A dashed line 20 indicates this start speed or idle speed. The first graph 22, which is drawn as a dashed line, illustrates the temporal characteristic of the speed of the internal combustion engine between the time t0 16 and the time t1 18 in case of a conventional torque feedforward control of the electric machine. A second graph 24, which is drawn as a solid line, illustrates the temporal characteristic of the speed of the internal combustion engine 42 between the time t0 16 and the time t1 18 in case of a torque feedforward control or pre-control of the electric machine 46 in accordance with the invention. A third graph 26, which is drawn as a dashed line, illustrates the temporal characteristic of a conventional torque feedforward control of the electric machine between the time t0 16 and the time t1 18. A fourth graph 28, which is shown as a solid line, illustrates the temporal characteristic of a torque feedforward control of the electric machine 46 in accordance with the invention between the time t0 16 and the time t1 18. Reference numeral 30 indicates the torques increase of the temporal characteristic of the torque feedforward controls of the electric machine 46 according to the invention, in order to compensate torque irregularities due to the compression work of the internal combustion engine 42.

In accordance with the invention, an improvement of the quality of the running-up to speed process of the engine is achieved in that known influences of possible oscillating torques are taken into account in the torque feedforward control of the electric machine 46. In accordance with the invention it is therefore provided that the start of the internal combustion engine 42 is performed in a manner such that the electric machine 46 is feedforward-controlled with the help of a torque characteristic related to a crankshaft angle wherein the torque characteristic is stored in a control device of the electric machine 46 and wherein the torque characteristic takes into account fluctuations caused by the oscillating torques such that a given setpoint speed characteristic (also setpoint torque characteristic) is maintained with as small as possible deviations. Furthermore, a control, in particular a closed-loop control, can be superimposed on this process, in order to compensate the remaining in deviations.

The preset torque characteristic can be determined in advance with tests on the internal combustion engine 42 by a time-resolved measurement of the torque and the angular position of the crankshaft 44 during starting procedures or also during an operation with different constant speeds. Alternatively, the preset torque characteristic can also be calculated. Ideally, the influence of different engine temperatures (for example by determining a coolant temperature or an oil temperature) and/or the intake air pressure and/or the intake air mass flow and/or a cylinder charge and/or an intake air temperature and/or a valve control timing and/or valve travel values is taken into account, which can change the friction behavior, the heat transfer behavior and the compression work as a result of different engine charges. Furthermore, the influence of various systems or units, which on their part can impress additional constant or also varying torques (for example intake air compressors, air-conditioning compressors and so forth), which also can at least depend on the temperature, can be taken into account. Since the compression work of the first compressing cylinder may be reduced due to the leakage in case of an engine at standstill depending on the piston position or crankshaft position, an additional correction may in this case be provided, if necessary.

The torque characteristic to be preset for the engine start is then determined by superimposing a weighted oscillating torque, which is related to the crankshaft ankle, onto a base torque characteristic for overcoming the mean or average friction and for ensuring the desired angular acceleration of the engine crankshaft 44, such that the speed deviations (or torque fluctuations) become minimal.

In accordance with an advantageous mode of the method according to the invention, the setpoint torque characteristic is determined by measuring forces which are introduced into the vehicle body 58 via the engine mountings 52 and/or transmission mountings 54 during a startup procedure and by presetting the torque characteristic of the electric machine 46 that is to be preset such that the mounting forces have minimal amplitudes. Alternatively, the torque characteristic can also be adjusted in a manner such that the excitation of natural frequencies of the vehicle body 58 is as small as possible. For example, an influence or effect on the vehicle body 58, which subjectively perceived as annoying by a driver or vehicle occupant, is detected and is minimized by a reproduction in the preset torque characteristic for the engine start.

For the suggested method it is required that the setpoint torque characteristic is assigned to the crankshaft position of the engine. For this purpose, a rundown detection can be used which detects the angular position of the crankshaft 44 when turning off the engine, or a method can be used, that turns off the internal combustion engine 42 in a defined angular position. A conventional method for setting a defined crankshaft position is for example disclosed in German Patent Application Publication No. DE 102 01 278 A1.

In accordance with an expanded mode, the method can also be used for a predetermined period beyond the time of reaching the start speed 20. In this case, the start speed 20 is the speed at which a fuel injection and, if applicable, an ignition starts or occurs (spark ignition engine). The torque fluctuations that are caused by the first combustion processes when these combustion processes set in, are in this case additionally also taken into account and are damped with corresponding electromotive counter torques of the electric machine 46 in the torque curve to be feedforward-controlled, in order to ensure an especially soft start of the combustion engine operation when starting up the internal combustion engine 42. These feedforward control torques are then terminated in a subsequent second period.

In summary, a method is provided which achieves an optimal speed increase during the startup procedure of the internal combustion engine 42 and, respectively, a speed decrease when turning off the internal combustion engine 42 (presetting a temporal course in a non-stationary phase). In accordance with the invention, the optimal curve of the speed increase and, respectively, the speed decrease is determined by an evaluation of the forces which are introduced into the body 58 via the mountings 52, 54, 56 of the drivetrain components. In this manner it is possible to obtain a measure for the subjective feeling of comfort in order to perform or apply a comfort-optimized start or turning off of the internal combustion engine 42 based thereon.

Figure 2:
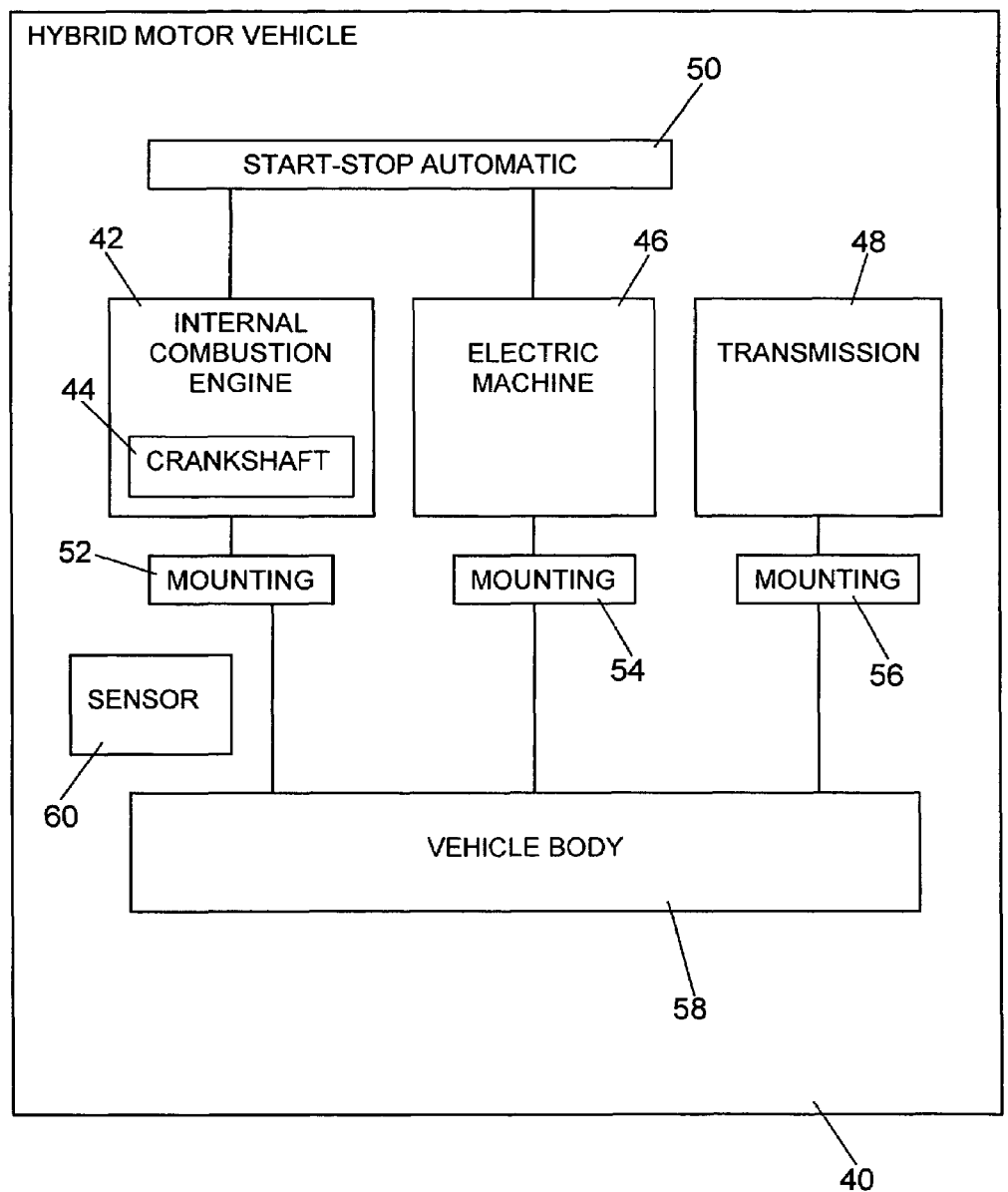
FIG. 2 is a schematic diagram illustrating components of a hybrid motor vehicle according to the invention.

FIG. 2 is a schematic diagram illustrating components of a hybrid motor vehicle 40 according to an embodiment of the invention. The hybrid motor vehicle 40 includes an internal combustion engine 42 with a crankshaft 44, an electric machine 46 and a transmission 48. The drivetrain components 42, 46, 48 exert forces on the vehicle body 58 via mountings 52, 54, 56. In accordance with an embodiment of the invention, a sensor 60 is provided in the hybrid motor vehicle 40 for measuring forces introduced into the vehicle body 58.

LIST OF REFERENCE NUMERALS 10 horizontal axis: time
12 vertical axis: speed of the internal combustion engine
14 vertical axis: torque of the electric machine
16 time t0: engine start
18 time t1: start speed or idle speed reached
20 dashed line: start speed or idle speed
22 first graph: variation of speed with time (according to prior art)
24 second graph: variation of speed with time (according to the invention)
26 third graph: variation with time of a conventional torque feedforward control
28 fourth graph: variation with time of a torque feedforward control according to the invention
40 hybrid motor vehicle
42 internal combustion engine
44 crankshaft
46 electric machine
48 transmission
52, 54, 56 mountings
58 vehicle body
60 sensor

What is claimed is:

1. A method for operating a hybrid motor vehicle, the method which comprises:
providing the hybrid motor vehicle having an internal combustion engine and at least one electric machine; and
performing, during at least one of a turning off process of the internal combustion engine and a starting process of the internal combustion engine, a feedforward control on the torque characteristic of the electric machine for one of starting the internal combustion engine and when turning off the internal combustion engine and performing the feedforward control on the torque characteristic of the electric machine by providing a given base torque characteristic for overcoming a mean friction and for ensuring a given angular speed of a crankshaft of the internal combustion engine and by superimposing an oscillating torque on the given base torque characteristic, the oscillating torque being dependent on a position of the crankshaft.

2. The method according to claim 1, which comprises measuring forces introduced into a vehicle body via a mounting of a drivetrain component.

3. The method according to claim 2, which comprises measuring the forces introduced into the vehicle body only beforehand in order to optimize a torque-feedforward control characteristic.

4. The method according to claim 2, which comprises permanently measuring the forces introduced into the vehicle body by using a sensor provided in the hybrid motor vehicle.

5. The method according to claim 1, which comprises measuring forces introduced into a vehicle body via at least one mounting of at least one drivetrain component selected from the group consisting of the internal combustion engine and a transmission.

6. The method according to claim 1, which comprises performing the feedforward control on the torque characteristic of the electric machine for one of starting the internal combustion engine and when turning off the internal combustion engine such that forces, which are present at at least one mounting of at least one drivetrain component, have minimal amplitudes.

7. The method according to claim 1, which comprises performing the feedforward control on the torque characteristic of the electric machine for one of starting the internal combustion engine and when turning off the internal combustion engine such that forces, which are present at at least one mounting of at least one drivetrain component selected from the group consisting of the internal combustion engine and a transmission, have minimal amplitudes.

8. The method according to claim 1, which comprises:
turning off the internal combustion engine in given operating situations by using a start-stop automatic; and
starting the internal combustion engine again, in case of a driver request, by using the electric machine.

9. The method according to claim 1, which comprises performing the feedforward control on the torque characteristic of the electric machine such that an excitation of natural frequencies of a vehicle body is minimized.

10. The method according to claim 1, which comprises superimposing an additional control onto the feedforward control of the torque characteristic of the electric machine in order to minimize mounting forces.

11. The method according to claim 1, which comprises performing the feedforward control on the torque characteristic of the electric machine, in case of starting the internal combustion engine, until one of a given start speed, at which a fuel injection begins, and a given idle speed is reached.

12. The method according to claim 11, which comprises additionally performing the feedforward control on the torque characteristic of the electric machine subsequent to reaching the start speed beyond a given period by additionally superimposing a counter torque on a feedforward-controlled torque characteristic of the electric machine such that torque oscillations, which are caused by first ones of combustion processes that are setting in, are damped.

13. The method according to claim 1, which comprises using a starter generator as the electric machine.

14. The method according to claim 1, which comprises providing the electric machine such that the electric machine has a power in a range between 7 kW and 25 kW.

15. The method according to claim 1, which comprises providing the electric machine such that the electric machine has a power in a range between 8 kW and 20 kW.

16. The method according to claim 1, which comprises providing the electric machine such that the electric machine has a power of substantially 15 kW.

* * * * *